(12) United States Patent
Newman et al.

(10) Patent No.: US 10,927,622 B2
(45) Date of Patent: Feb. 23, 2021

(54) REMOVAL OF FINE SOLIDS FROM OILFIELD FLUIDS

(71) Applicant: Halliburton Energy Services, Inc., Houston, TX (US)

(72) Inventors: Katerina V. Newman, Houston, TX (US); Timothy N. Harvey, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 561 days.

(21) Appl. No.: 15/563,604

(22) PCT Filed: Apr. 24, 2015

(86) PCT No.: PCT/US2015/027526
§ 371 (c)(1),
(2) Date: Oct. 1, 2017

(87) PCT Pub. No.: WO2016/171718
PCT Pub. Date: Oct. 27, 2016

(65) Prior Publication Data
US 2018/0080295 A1    Mar. 22, 2018

(51) Int. Cl.
*E21B 21/06*    (2006.01)
*B01D 21/26*    (2006.01)
*B01D 37/02*    (2006.01)
*B01D 21/30*    (2006.01)

(52) U.S. Cl.
CPC .......... *E21B 21/066* (2013.01); *B01D 21/262* (2013.01); *B01D 21/30* (2013.01); *B01D 37/02* (2013.01)

(58) Field of Classification Search
CPC ..... E21B 21/066; E21B 21/06; B01D 21/262; B01D 21/30; B01D 21/26; B01D 37/02
USPC ........................................................ 210/739
See application file for complete search history.

(56) References Cited

U.S. PATENT DOCUMENTS

| 6,159,360 | A | 12/2000 | Gerteis et al. |
| 7,168,571 | B2 | 1/2007 | Gerteis et al. |
| 2002/0074269 | A1 | 6/2002 | Hensley et al. |
| 2008/0121564 | A1 | 5/2008 | Smith et al. |
| 2008/0283301 | A1* | 11/2008 | Sherwood ............... E21B 21/01 175/206 |
| 2013/0023448 | A1 | 1/2013 | Glasscott et al. |

(Continued)

OTHER PUBLICATIONS

PCT International Search Report and Written Opinion issued in corresponding application No. PCT/US2015/027526 dated Dec. 1, 2015, 14 pgs.

(Continued)

*Primary Examiner* — Robert Clemente
*Assistant Examiner* — Akash K Varma
(74) *Attorney, Agent, or Firm* — Chamberlain Hrdlicka

(57) ABSTRACT

In some embodiments, a pre-treatment source generates pre-treated oilfield fluid from oilfield fluid, prior to injection into an inverting filter centrifuge system. The pre-treatment source increases an efficiency of separating solids from the injected oilfield fluid. An inverting filter centrifuge coupled to the pre-treatment source generates filtered oilfield fluid from the pre-treated oilfield fluid. Post-treatment may be applied to the filtered oilfield fluid. Additional apparatus, systems, and methods are disclosed.

16 Claims, 5 Drawing Sheets

(56) References Cited

U.S. PATENT DOCUMENTS

2014/0175008 A1 6/2014 Mathis
2014/0371113 A1* 12/2014 Fout ..................... E21B 21/066
507/117

OTHER PUBLICATIONS

Heinkel Filtering Systems Inc.,"Technology highlight: Inverting Filter Centrifuge," Dec. 10, 2007, Swedesboro, NJ. Retrieved on the Internet at http://www.chem.info/articles/2007/12/product-technology-highlight-new-generation-inverting-filter-centrifuges.

* cited by examiner

REMOVAL OF FINE SOLIDS FROM OILFIELD FLUIDS

BACKGROUND

Oilfield fluids may be used to facilitate well drilling through geological formations, to clean up a well bore and to complete a well, among other specific functions. For example, drilling fluid may be used to provide hydrostatic pressure to prevent formation fluids from entering the wellbore, to cool the drill bit, or for cleaning purposes such as lifting cuttings out of the wellbore to the surface. Completion fluids may include low or no-solids fluids or, occasionally, drilling fluid may be used when a well is being completed. The completion fluid may be selected not only for its ability to control formation pressure, but also for properties that minimize formation damage, reduce corrosion, and thermal stability.

Since formations to be drilled vary widely, oilfield fluids will vary, depending upon the operational goals. Drilling and completion fluids may need to be handled differently to increase the useful life of the fluid and to ensure optimized rates of penetration while drilling. Disposal of drilling fluids after their useful life may involve environmental liability. Often, fluids cannot be reused for drilling operations due to contamination with colloidal solids (i.e., drilled solids) from drilled formations. Some oilfield fluids are relatively expensive to produce. Thus, to optimize drilling costs, it may be beneficial to reuse oilfield fluids as much as possible.

DETAILED DESCRIPTION

An inverting filter centrifuge system may be used to remove solids, including fine and near-colloidal solids, from oilfield fluids that originated from drilling fluids, completion fluids, and their components and derivatives. The near-colloidal solids can originate from drilled formations and commercial solids and suspended in a drilling fluid that may be with dilutants such as new drilling fluids, solvents such as water or oil, or treated with chemical agents and filtration aids. The filtered drilling fluid or components of the drilling fluid (e.g. base oil, commercial solids may then be returned for reuse or further treatment and purification.

As used herein, fine and near-colloidal solids are defined as solids that are less than approximately 10 microns. Commercial solids are defined as solids that are original components of drilling fluids (e.g., Barite, calcium carbonate). Also as used herein, oil field fluids are defined as any fluid or liquid useable in an oil field or in a process of treating oilfield fluids that may be called solids control and/or drilling waste management. Oilfield fluids include drilling fluids, completion fluids, components of drilling fluids and completion fluids, and derivatives of completion fluids. For example, such fluid may include hydrocarbons, a mixture of hydrocarbons, liquefied gas, one or more solvents, and/or a mixture of hydrocarbons and solvents.

Figure 1:
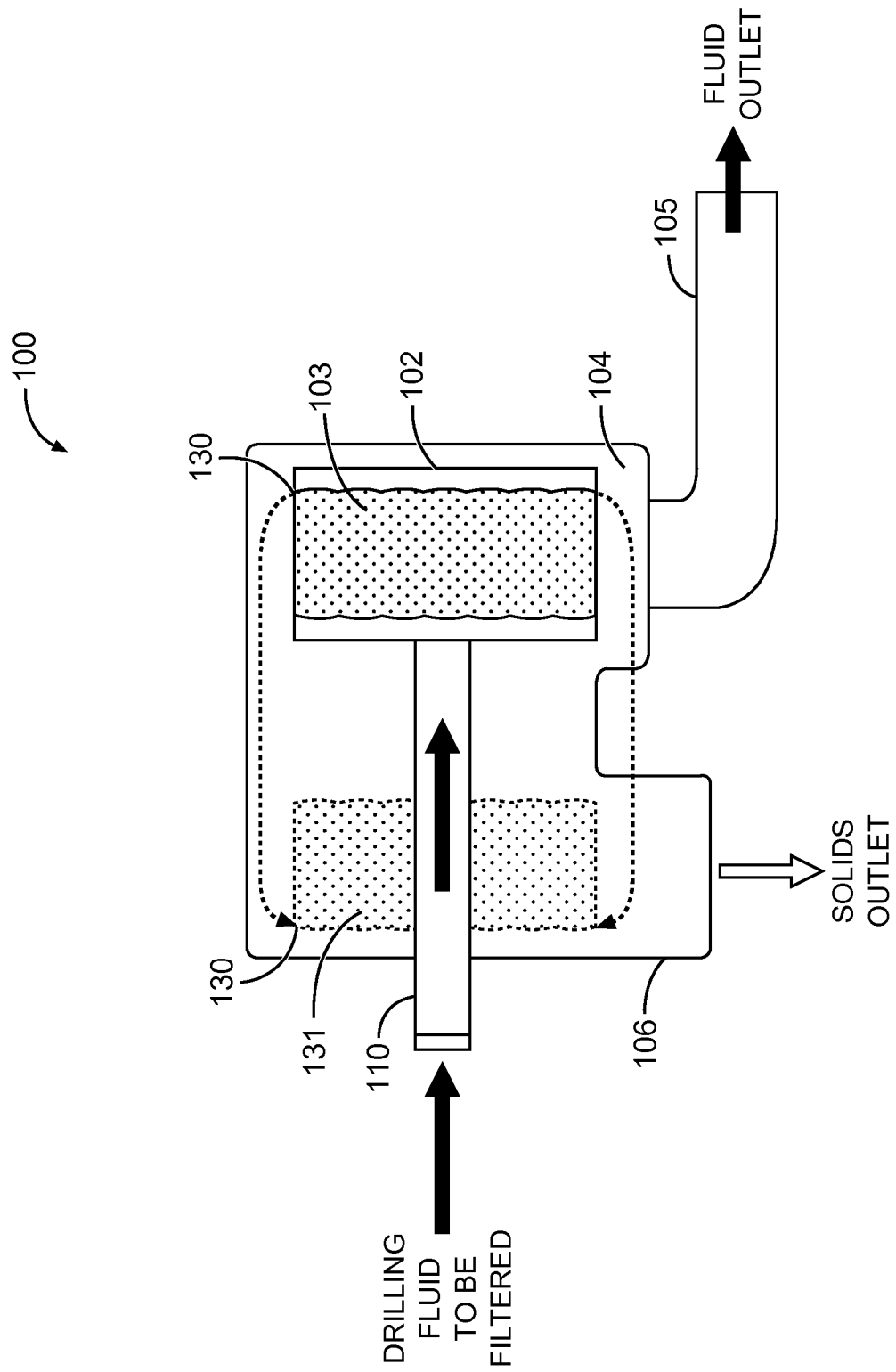
FIG. 1 is a block diagram showing an example inverting filter centrifuge system for removal of solids from oilfield fluids, according to aspects of the present disclosure.

FIG. 1 is a block diagram showing an example inverting filter centrifuge system for removal of solids from oilfield fluids, according to aspects of the present disclosure. The centrifuge 100 comprises an oilfield fluid to be filtered inlet 110, a rotating drum 102 with a filter 103, a solids outlet 106, and a filtered fluid outlet 105. These centrifuge elements are for purposes of illustration only as other centrifuges may have different elements to perform substantially the same task of separating fluids and solids originated from oilfield fluids.

During operation, the fluid to be filtered is injected into the drum 102. The drum 102 spins at a rotational rate that results in centrifugal force causing the fluid with the solids in the fluid to draw away from the center of rotation of the drum.

The filter 103 is a media allowing near-colloidal particles (e.g., approximately less than or equal to 10 microns in size) and larger to remain on the filter 103. The filtered fluid collects below the drum 102 in a collection area 104 and is eventually removed from the centrifuge 100 through a fluid outlet 105. The filtered fluid may be removed through gravity or a pumping force or a combination of these.

After the filter 103 has collected an amount of solids in the form of a cake of material, the filter 103 is pulled inside out (i.e., inverted) from the drum 102. The filter 103 is inverted by axially moving one side 130 (e.g., right side) of the filter 103 such that the side 130 that has been moved ends up on an opposite side (e.g., left side) and the filter cake material on the inside 131 of the filter 103 is now exposed as the outside of the filter 103. This solids discharge operation may be accomplished as the drum 102 rotates. The solids are discharged from the centrifuge through the solids outlet 106. Media may be washed to minimize blinding.

The operation of the inverting filter centrifuge 100 may be on a batch, semi-batch, or continuous basis. An example of the centrifuge 100 operating on a batch basis includes the centrifuge stopping operation after the filter is full of solids, the solids discharged from the centrifuge 100, and the centrifuge 100 starting up again after the filter 103 is returned to its operating location.

An example of the centrifuge 100 operating on a semi-batch or continuous basis includes the use of two or more centrifuges 100 such that while one continues operating while the other discharges its solids from the filter. For example, the oilfield fluid to be filtered inlet 110 may be connected to two or more centrifuges 100 simultaneously and the solids discharge event timed such that only one centrifuge 100 is discharging via its solids outlet 106 at one time.

Figure 2:
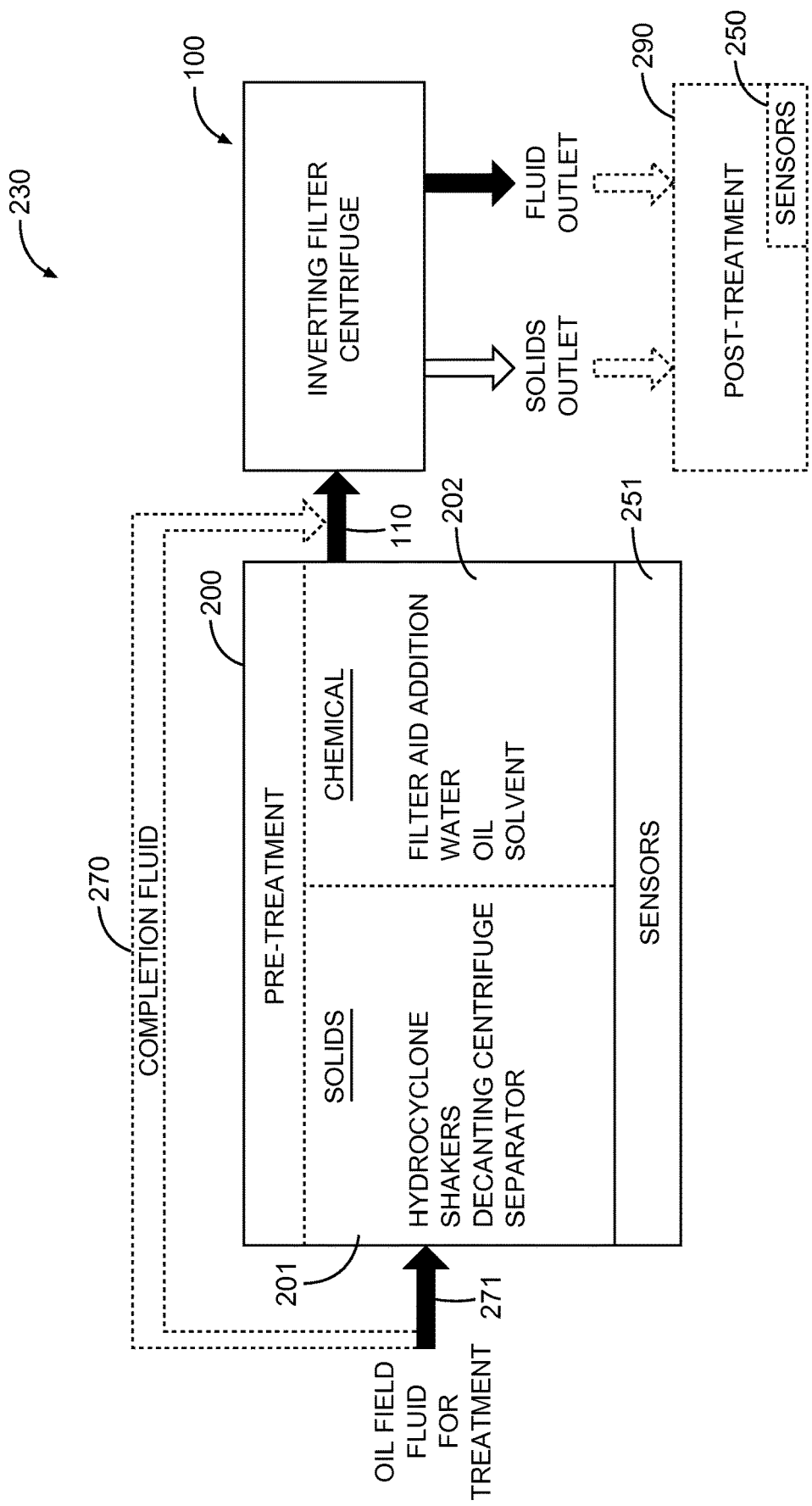
FIG. 2 is a block diagram showing another example inverting filter centrifuge system for removal of solids from oilfield fluids, according to aspects of the present disclosure.

FIG. 2 is a block diagram showing another example inverting filter centrifuge system for removal of solids from oilfield fluids, according to aspects of the present disclosure. This example includes an inverting filter centrifuge 100 such as the example shown in FIG. 1.

A pre-treatment 200 may be incorporated prior to the oilfield fluid inlet 110 of the inverting filter centrifuge 100. Oilfield fluids returned from downhole may be injected into the pretreatment 200. The oilfield fluids may include drilling fluid and completion fluid. In an example, the completion fluid may bypass 270 the pre-treatment 200 and the drilling fluid may be injected 271 into the pre-treatment 200. In another example, both the completion fluid and the drilling fluid may be injected 271 into the pre-treatment 200.

The pre-treatment 200 may provide one or more pre-treatments of the fluids to be filtered prior to the oilfield fluid being injected to the inverting filter centrifuge 100. Such pre-treatment may increase the efficacy and efficiency of separating the solids from the fluid during the filtering process in comparison to not pre-treating the fluid by removing the larger solids from the oilfield fluid prior to removing the smaller solids with the inverting filter centrifuge. A number of different pre-treatments may be included in the pre-treatment 200, including solids pre-treatment 201 and chemical pre-treatment 202.

The solids pre-treatment 201 may include various types of pre-treatment for separation of fluids and solids. In an example, a hydrocyclone may be used. In one example of the hydrocyclone 201, the fluid is injected into an inverted cone tangentially such that the resulting spinning effect of the liquid forces solids to the wall of the device. The solids are removed from the bottom (apex) of the cone while the cleaned fluid is removed from the top.

The solids pre-treatment 201 may include also a decanting centrifuge, inclined plate separators or other types of pre-filtration devices. For example, an additional centrifuge (e.g., non-inverting filter centrifuge) may be used to remove larger particles from the oilfield fluid prior to entering the inverting filter centrifuge 100. A decanting centrifuge can be included for removing solids/particles larger than approximately 10 microns prior to entry into the inverting filter centrifuge 100.

Another example of solids pre-treatment 201 may be an inclined plate separator. An inclined plate separator includes a plurality of inclined plates in a vessel such that the stream of the oilfield fluid to be filtered enters from the top of the vessel and flows down a feed channel underneath the inclined plates. The fluid then flows up inside a clarifier between the inclined plates. During this time solids settle onto the plates and eventually fall to the bottom of the separator vessel. The route a particle takes will depend upon the flow rate, comparative densities, and rheology of the suspension. At the bottom of the vessel, a hopper or funnel collects these particles such as the solids that may be continuously or intermittently discharged. Above the inclined plates, filtered relatively clean oilfield fluid may be produced which is drawn off thereafter into an outlet channel to be injected 110 to the inverting filter centrifuge 100.

The chemical pre-treatment 202 may include the addition of solvents, liquefied gases, oils, water, chemicals, such heavy brines, polyols, surfactants, coagulants, flocculants, settling aids, elevated temperatures, and combinations thereof. For example, such chemical pretreatment may include dodecylbenzylesulfonic acid (DDBSA), alkylbenzene sulfonic acid (LABSA), saturated calcium chloride brine, aluminum salts, titanium salts, and other types of chemical pre-treatment.

Another type of chemical pre-treatment 202 may include a filter aid addition. Examples of filter aid additions include rice haul ash, diatomaceous earth (e.g. fresh water and marine diatoms), expanded amorphous aluminum silicates, calcium and magnesium silicates, cellulose fibers, modified organosilica, nanoporous organosilica, swellable nanoporous organosolica, non-crystalline solids, glass beads, perlite, zeolite, fly ash, zeolites, and other materials. Filter aid additions may also include surfaces treated by a variety of chemical and/or morphologically modified pre-treatments.

With the use of the filter aid addition, oleaginous fluids may be dewatered while being filtered by absorption of trace amounts of water by the filter aid. Wax and asphaltene removal from oleaginous fluids may be facilitated with the use of the filter aid addition. The chemical pretreatment 202 may be removed from the filtered fluid in a subsequent process.

The pre-treatment 200 may also include one or more measuring instruments or sensors 251 to perform measurements on the oilfield fluid to be filtered in order to determine whether pre-treatment is desirable and/or what type of pre-treatment is useful for a given composition of oilfield fluid. For example, if sensor measurements show that the oilfield fluid to be filtered has a high concentration of relatively large particles (e.g., larger than 10 μm), one or more of the pre-treatment options may be used that works efficiently with larger particles. The pre-treatment sensors 251 may include one or more of flowmeters, thermal conductivity sensors, near infrared (NIR) sensors, X-ray based sensors, optical-based sensors, electrochemical sensors, and/or electromagnetic sensors, among others. One or more of the above-described pre-treatments may be used alone or in any combination.

The example of FIG. 2 may optionally include a post-treatment 290. The type of post-treatment applied to the solids, the fluid, or both the solids and the fluid may include an additional centrifuge, additional chemical treatment, thermal distillation, or a combination of all to further separate solids from the filtered fluid and/or to remove additional fluid from the solids.

The post-treatment 290 may also include various sensors 250 (e.g., Coriolis flowmeters, thermal conductivity sensors, near infrared (NIR) sensors, X-ray based sensors, optical-based sensors, electrochemical sensors, electromagnetic sensors). The sensors 250 in the post-treatment block 290 may be used for direct or indirect determination of the centrifuge efficacy and efficiency, as well as its mechanical health, in order to determine if post-treatment is desired for further filtration. The sensors 250 also may determine what type of post-treatment is best based on the measured composition of the filtered oilfield fluid. Additionally, any of the pre-treatment aids 200 may also be used in the post-treatment 290.

Figure 3:
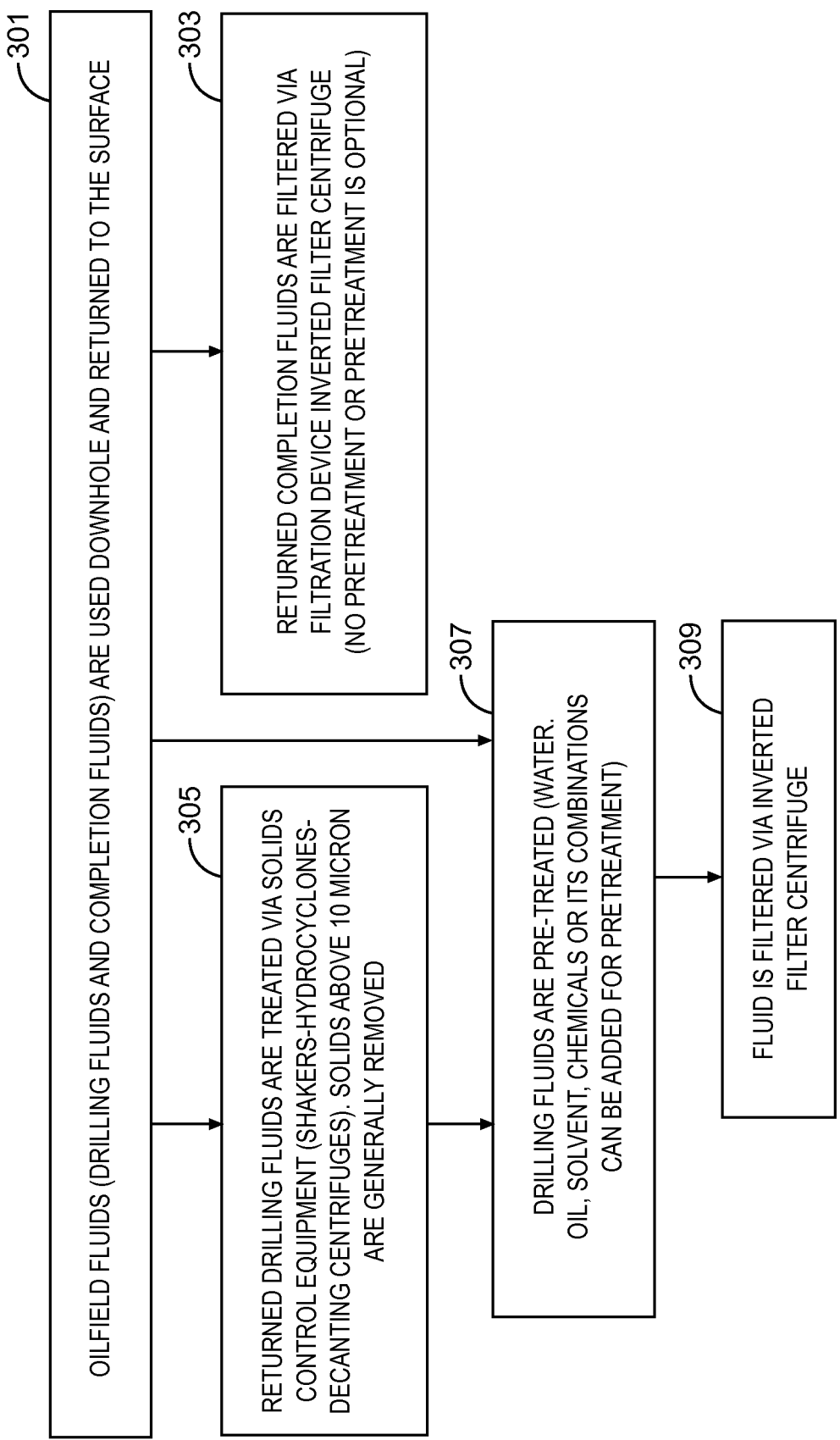
FIG. 3 is a flowchart of an example method for operation of an inverting filter centrifuge system for removing solids from oilfield fluids, according to aspects of the present disclosure.

FIG. 3 is a flowchart of an example method for operation of an inverting filter centrifuge system for removing solids from oilfield fluids, according to aspects of the present disclosure. In many examples, not all of the subsequently described processes are necessary for proper filtering of the oilfield fluid. For example, as described previously, the pre-treatment 200 and post-treatment processes 290 may be optional in some examples.

In block 301, the oilfield fluids are used downhole and returned to the surface. The oilfield fluids may include, drilling fluids and/or completion fluids.

In block 303, the returned completion fluids are filtered via a filtration device or the inverted filter centrifuge. In the example of completion fluids, the pretreatment may be optional.

In block 305, the returned drilling fluids are pre-treated via solids control equipment (e.g., shakers, hydrocyclones, decanting centrifuges), as an example. The solids pre-treatments generally remove solids greater than 10 microns. In another example, the returned drilling fluids (or the pre-treated drilling fluids from block 305) are chemically pre-treated in block 307. In block 307, the returned drilling fluids or the solids control pre-treated drilling fluids may be pre-treated with water, oil, solvents, chemicals, heat, or any combination of these. The pre-treatment step may produce reduce viscosity drilling fluid. The pre-treated drilling fluids may then be filtered via the inverted filter centrifuge in block 309.

Figure 4:
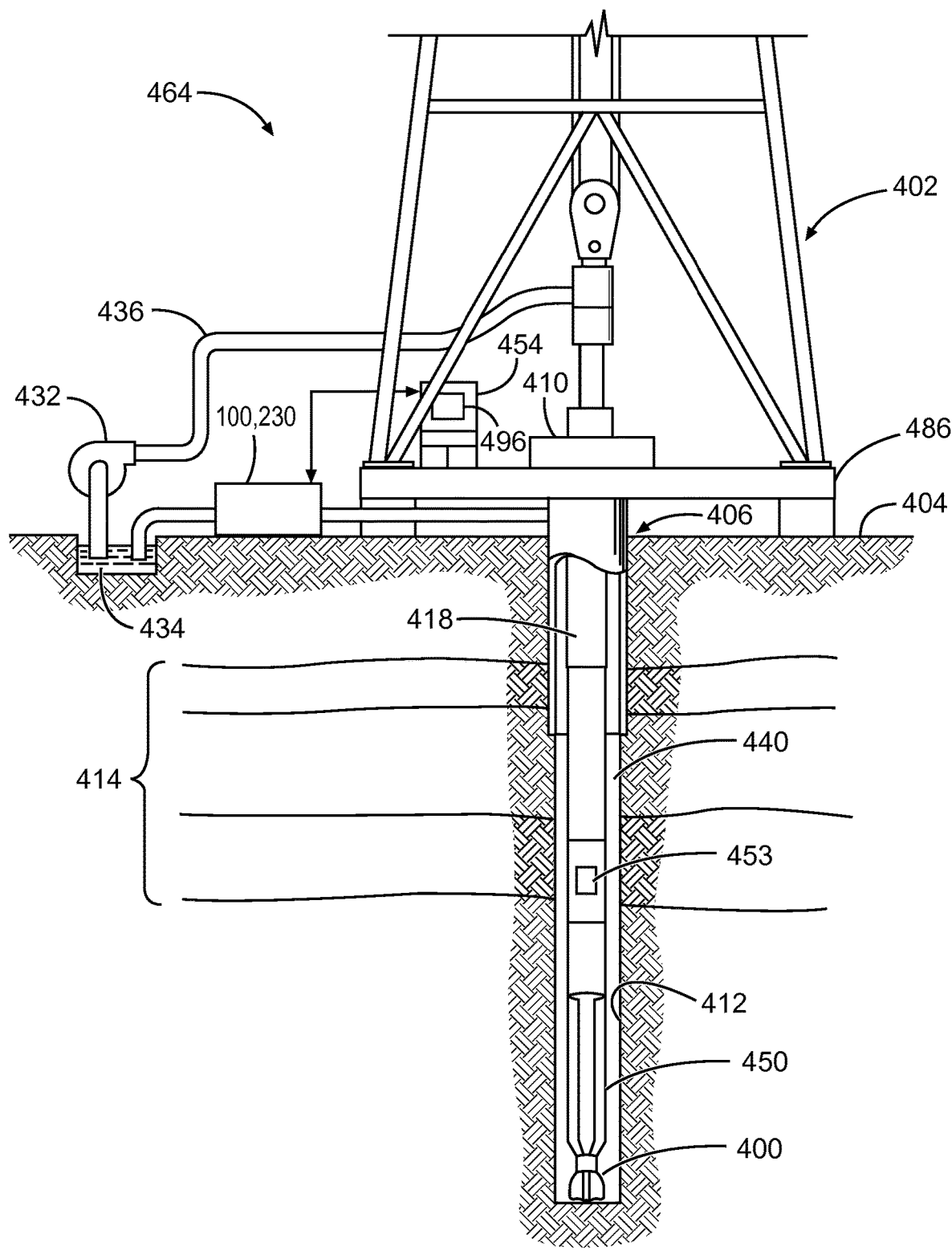
FIG. 4 is a diagram showing an example drilling system, according to aspects of the present disclosure.

FIG. 4 is a diagram showing an example drilling system, according to aspects of the present disclosure. The system includes one or more of the example inverting filter centrifuge systems 100, 230 as described previously.

A drilling rig 402 is disposed over a well 406 on the surface 404 of a subsurface formation 414 and may provide support for a drill string 450 including a drill bit 400. The drill string 450 may operate to penetrate the rotary table 410 for drilling the borehole 412 through the subsurface formations 414.

During drilling operations, a mud pump 432 may pump oilfield fluid (e.g., drilling mud) from a mud pit 434 through a hose 436, into the drill pipe 418, and down to the drill bit 400. The drilling fluid can flow out from the drill bit 400 and be returned to the surface 404 through an annular space 440 between the drill pipe 418 and the sides of the borehole 412. One or more of the inverting filter centrifuge systems 100, 230 may be used to filter solids from the returning fluid. The filtered drilling fluid may then be returned to the mud pit 434. In some examples, the drilling fluid may be used to cool the drill bit 400, as well as to provide lubrication for the drill bit 400 during drilling operations. Additionally, the drilling fluid may be used to remove subsurface formation cuttings created by operating the drill bit 400.

A workstation 454 having a controller 496 may include modules comprising hardware circuitry, a processor, and/or memory circuits that may store software program modules and objects, and/or firmware, and combinations thereof. The workstation 454 and controller 496 may be configured to control the direction, depth, rate, and diameter of the wellbore drilling as well as the filtration process performed by the inverting filter centrifuge system 100, 230 by executing instructions (e.g., see method of FIG. 3). For example, the workstation 454 and controller 496 may use the above-described sensors 250, 251 of the inverting filter centrifuge system to determine if pre or post-treatment processing of the drilling fluid to be filtered or the filtered drilling fluid will be useful. The workstation 454 and controller 496 may then select an appropriate pre or post-treatment process as previously described. An example workstation 454 and controller 496 may be realized by the system of FIG. 5.

Operation of the inverting filter centrifuge systems 100, 230 may optionally be controlled from control logic and pre-treatment sensors 453 downhole in the drill string, or from a combination of both the workstation 454 and the downhole control logic and sensors 453. As an example operation, the workstation 454 and/or the downhole control logic and sensors 453 may measure parameters (e.g., viscosity, density) of the drilling fluid during a logging while drilling (LWD) or measure while drilling (MWD) operation and use that data to determine how best to apply pre-treatment and/or filter the drilling fluid.

Figure 5:
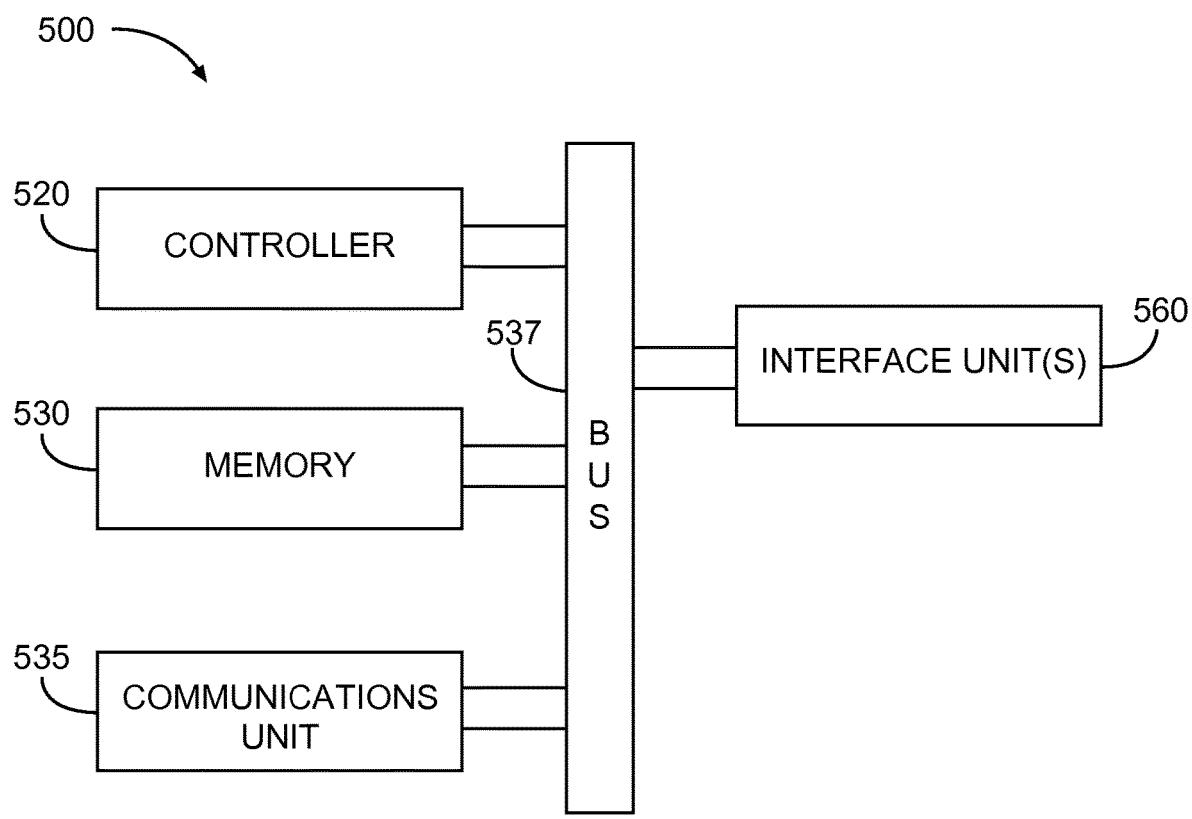
FIG. 5 is a block diagram of an example system operable to execute the methods herein, according to aspects of the present disclosure.

FIG. 5 is a block diagram of an example control system operable to execute the methods herein, according to aspects of the present disclosure. The control system 500 may include circuitry (e.g., a controller, workstation, control logic) 520, a memory 530, a communications unit 535, and an interface unit 560 coupled together over a bus 537.

The circuitry 520 may be realized as a processor or a group of processors that may operate independently depending on an assigned function. The circuitry 520 may include control circuitry such as one or more microprocessors.

The memory 530 may include volatile and/or non-volatile memory. For example, the memory may include read only memory (ROM), random access memory (RAM) (e.g., SRAM, DRAM), flash, optical drives, and/or magnetic disk storage (e.g., hard drives).

The communications unit 535 may include downhole communications for appropriately located sensors in a wellbore. Such downhole communications can include a telemetry system. The communications unit 535 may use combinations of wired communication technologies and wireless technologies at frequencies that do not interfere with on-going measurements.

The bus 537 may provide electrical conductivity among the components of the system 500. The bus 537 may include an address bus, a data bus, and a control bus, each independently configured or in an integrated format. The bus 537 may be realized using a number of different communication mediums that allows for the distribution of components of the system 500. The bus 537 can include a network. Use of the bus 537 can be regulated by the circuitry 520.

The interface unit(s) 560 may allow a user to interface, control, and/or monitor the operation of the inverting filter centrifuge systems 100, 230 or components distributed within the system 500. The interface units 560 may take the form of monitors, key boards, touchscreen displays, sensors for measuring the purity of the fluid, and/or sensors for measuring the centrifuge efficacy and/or efficiency. Many embodiments may thus be realized, and the elements of several will now be listed in detail.

Example 1 is a system for removal of fine solids from oilfield fluids, the system comprising: a solids pre-treatment to generate solids pre-treated drilling fluid from drilling fluid returned from downhole; a chemical pre-treatment to generate chemically pre-treated or reduced viscosity drilling fluid from the solids pre-treated drilling fluid or the drilling fluid returned from downhole; and an inverting filter centrifuge coupled to the solids pre-treatment and the chemical pre-treatment, the inverting filter centrifuge to generate filtered drilling fluid or filtered completion fluid from the chemically pre-treated drilling fluid or completion fluid returned from downhole.

In Example 2, the subject matter of Example 1 can further include wherein the solids pre-treatment comprises a hydrocyclone, a centrifuge, a decanter centrifuge, elevated temperatures, or an inclined plate separator.

In Example 3, the subject matter of Examples 1-2 can further include wherein the pre-treatment comprises a filter aid addition.

In Example 4, the subject matter of Examples 1-3 can further include wherein the solids pre-treatment is to increase an efficiency of separating the solids from the drilling fluid returned from downhole.

In Example 5, the subject matter of Examples 1-4 can further include wherein the filter aid addition comprises rice haul ash, diatomaceous earth, expanded amorphous aluminum silicates, calcium and magnesium silicates, cellulose fibers, modified organosilica, nanoporous organosilica, swellable nanoporous organosolica, non-crystalline solids, glass beads, perlite, zeolite, fly ash, and/or zeolites.

In Example 6, the subject matter of Examples 1-5 can further include wherein the fine solids are less than approximately 10 microns.

In Example 7, the subject matter of Examples 1-6 can further include wherein the chemical pre-treatment includes solvents, liquefied gases, oils, water, chemicals, such heavy brines, polyols, surfactants, coagulants, flocculants, and/or settling aids.

In Example 8, the subject matter of Examples 1-7 can further include sensors coupled to the inverting filter centrifuge to determine whether to perform pre-treatment of the drilling fluid or post-treatment of the filtered drilling fluid.

In Example 9, the subject matter of Examples 1-8 can further include wherein the sensors determine a type of pre-treatment of the drilling fluid or a type of post-treatment for the filtered drilling fluid.

In Example 10, the subject matter of Examples 1-9 can further include wherein the sensors include flowmeters, thermal conductivity sensors, near infrared (NIR) sensors, X-ray based sensors, optical-based sensors, electrochemical sensors, or electromagnetic sensors.

In Example 11, the subject matter of Examples 1-10 can further include further comprising a post-treatment to remove pre-treatment aids.

Example 12 is a method for removing fine solids from oilfield fluid, the method comprising: pre-treating drilling fluid returned from downhole to generate solids pre-treated drilling fluid; chemically pre-treating the solids pre-treated drilling fluid or the drilling fluid returned from downhole to generate chemically pre-treated drilling fluid; and filtering, through an inverting filter centrifuge, the chemically pre-treated drilling fluid or completion fluid returned from downhole to generate filtered oilfield fluid.

In Example 13, the subject matter of Example 12 can further include performing post-treatment of the filtered oilfield fluid to condition the filtered oilfield fluid.

In Example 14, the subject matter of Examples 12-13 can further include performing sensor measurements of the filtered oilfield fluid to determine whether to perform post-treatment of the filtered oilfield fluid.

In Example 15, the subject matter of Examples 12-14 can further include performing sensor measurements of the drilling fluid returned from downhole or the completion fluid returned from downhole to determine a type of pre-treating.

In Example 16, the subject matter of Examples 12-15 can further include performing post-treatment of the filtered oilfield fluid to remove pre-treatment aids.

In Example 17, the subject matter of Examples 12-16 can further include performing sensor measurements of the filtered oilfield fluid to determine a type of post-treatment.

Example 18 is a system comprising: a drilling rig disposed on a surface of a geological formation to support a drill string in a borehole to rotate within an oilfield fluid to be filtered; an inverting filter centrifuge system coupled to the borehole, the inverting filter centrifuge system comprising: a solids pre-treatment to generate solids pre-treated drilling fluid from drilling fluid returned from downhole; a chemical pre-treatment to generate chemically pre-treated drilling fluid from the solids pre-treated drilling fluid; and an inverting filter centrifuge coupled to the solids pre-treatment and the chemical pre-treatment, the inverting filter centrifuge to generate filtered drilling fluid or filtered completion fluid from the chemically pre-treated drilling fluid or completion fluid returned from downhole; and circuitry coupled to the inverting filter centrifuge system, the circuitry to control operation of the inverting filter centrifuge system.

In Example 19, the subject matter of Example 18 can further include wherein the inverting filter centrifuge system comprises post-treatment sensors coupled to an inverting filter centrifuge, the sensors configured to perform direct or indirect determination of the centrifuge efficacy, efficiency, and/or mechanical health.

In Example 20, the subject matter of Examples 18-19 can further include pre-treatment sensors disposed on the drill string, the sensors to measure parameters of the drilling fluid to determine how to pre-treat and/or filter the drilling fluid.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for removal of fine solids from oilfield fluids including drilling fluid and completion fluid returned from downhole, the system comprising:
    a solids pre-treatment to generate solids pre-treated fluid from the drilling fluid or both the drilling fluid and the completion fluid;
    a chemical pre-treatment to generate chemically pre-treated or reduced viscosity fluid from the solids pre-treated fluid or the drilling fluid; and
    an inverting filter centrifuge comprising a rotating drum and filter and coupled to the solids pre-treatment and the chemical pre-treatment, the inverting filter centrifuge to generate filtered oilfield fluid by removing fine solids from the chemically pre-treated or reduced viscosity fluid or the completion fluid, wherein the fine solids to be removed are less than approximately 10 microns.

2. The system of claim 1, wherein the solids pre-treatment comprises a hydrocyclone, a centrifuge, a decanter centrifuge, elevated temperatures, or an inclined plate separator.

3. The system of claim 1, wherein the chemical pre-treatment comprises a filter aid addition.

4. The system of claim 1, wherein the solids pre-treatment is to increase an efficiency of separating the solids from the drilling fluid.

5. The system of claim 3, wherein the filter aid addition comprises rice haul ash, diatomaceous earth, expanded amorphous aluminum silicates, calcium and magnesium silicates, cellulose fibers, modified organosilica, nanoporous organosilica, swellable nanoporous organosolica, non-crystalline solids, glass beads, perlite, zeolite, fly ash, and/or zeolites.

6. The system of claim 1, wherein the chemical pre-treatment includes solvents, liquefied gases, oils, water, chemicals, such heavy brines, polyols, surfactants, coagulants, flocculants, and/or settling aids.

7. The system of claim 1, further comprising sensors coupled to the inverting filter centrifuge to determine whether to perform pre-treatment of the drilling fluid or post-treatment of the filtered drilling fluid.

8. The system of claim 7, wherein the sensors determine a type of pre-treatment of the drilling fluid or a type of post-treatment for the filtered drilling fluid.

9. The system of claim 7, wherein the sensors include flowmeters, thermal conductivity sensors, near infrared (NIR) sensors, X-ray based sensors, optical-based sensors, electrochemical sensors, or electromagnetic sensors.

10. The system of claim 1, further comprising a post-treatment to remove pre-treatment aids.

11. A method for removing fine solids from oilfield fluids including drilling fluid and completion fluid returned from downhole, the method comprising:

pre-treating the drilling fluid or both the drilling fluid and; the completion fluid to generate solids pre-treated fluid;

chemically pre-treating the solids pre-treated fluid or the drilling fluid to generate chemically pre-treated fluid; and filtering, through an inverting filter centrifuge, the chemically pre-treated fluid or the completion fluid to generate filtered oilfield fluid by removing fine solids, wherein the fine solids to be removed are less than approximately 10 microns.

12. The method of claim 11, further comprising performing post-treatment of the filtered oilfield fluid to condition the filtered oilfield fluid.

13. The method of claim 11, further comprising performing sensor measurements of the filtered oilfield fluid to determine whether to perform post-treatment of the filtered oilfield fluid.

14. The method of claim 11, further comprising performing sensor measurements of the drilling fluid or the completion fluid to determine a type of pre-treating.

15. The method of claim 11, further comprising performing post-treatment of the filtered oilfield fluid to remove pre-treatment aids.

16. The method of claim 11, further comprising performing sensor measurements of the filtered oilfield fluid to determine a type of post-treatment.

* * * * *